Oct. 25, 1966 R. E. SOLOMON 3,281,074
DUAL TEMPERATURE OVEN CONTROL SYSTEM
Filed Feb. 5, 1964 3 Sheets-Sheet 1

INVENTOR.
RALPH E. SOLOMON
BY Lyon & Lyon
ATTORNEYS

INVENTOR.
RALPH E. SOLOMON
BY
Lyon & Lyon
ATTORNEYS

Oct. 25, 1966 R. E. SOLOMON 3,281,074
DUAL TEMPERATURE OVEN CONTROL SYSTEM
Filed Feb. 5, 1964 3 Sheets-Sheet 3

INVENTOR.
RALPH E. SOLOMON
BY
Lyon & Lyon
ATTORNEYS

United States Patent Office 3,281,074
Patented Oct. 25, 1966

3,281,074
DUAL TEMPERATURE OVEN CONTROL SYSTEM
Ralph E. Solomon, Playa Del Rey, Calif., assignor, by mesne assignments, to International Telephone and Telegraph Corporation, New York, N.Y., a corporation of Maryland
Filed Feb. 5, 1964, Ser. No. 342,650
12 Claims. (Cl. 236—46)

The present invention relates to means and techniques useful in domestic oven controls and involves generally a mechanical connection between a timer and one of two dual temperature controls for an oven.

Briefly, as described herein, there is provided a pair of manually settable thermostats and a manually wound adjustable timer in which an element thereof is movable from a first (Manual) position through a second (Automatic) position to a third (Time) position, the timer incorporating conventional means whereby such element is automatically returnable from such third position to said first position through such second position. In such return movement, means are provided to arrest movement of such element in its second position wherein a single pole double throw switch is operated to transfer temperature control from one of the thermostats to the other of the thermostats. Such arresting means for the timer may be disabled by movement of a knob of one of the thermostats to an Off position or low temperature setting in which case the timer is allowed to continue to time itself out and return to its first position.

It is therefore a general object of the present invention to provide means and techniques for accomplishing the above indicated functions and results.

A specific object of the present invention is to provide an improved dual thermostat system.

Another specific object of the present invention is to provide an arrangement in which operation of a temperature selector knob to an Off or low temperature setting is all that is necessary to assure a change in mode from Automatic to Manual operation thereby obviating many problems in prior art arrangements wherein failure to return a mode selector to a manual position after using an automatic or time control has been a source of many service complaints.

Another specific object of the present invention is to provide a simple mechanical arrangement for accomplishing these purposes.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
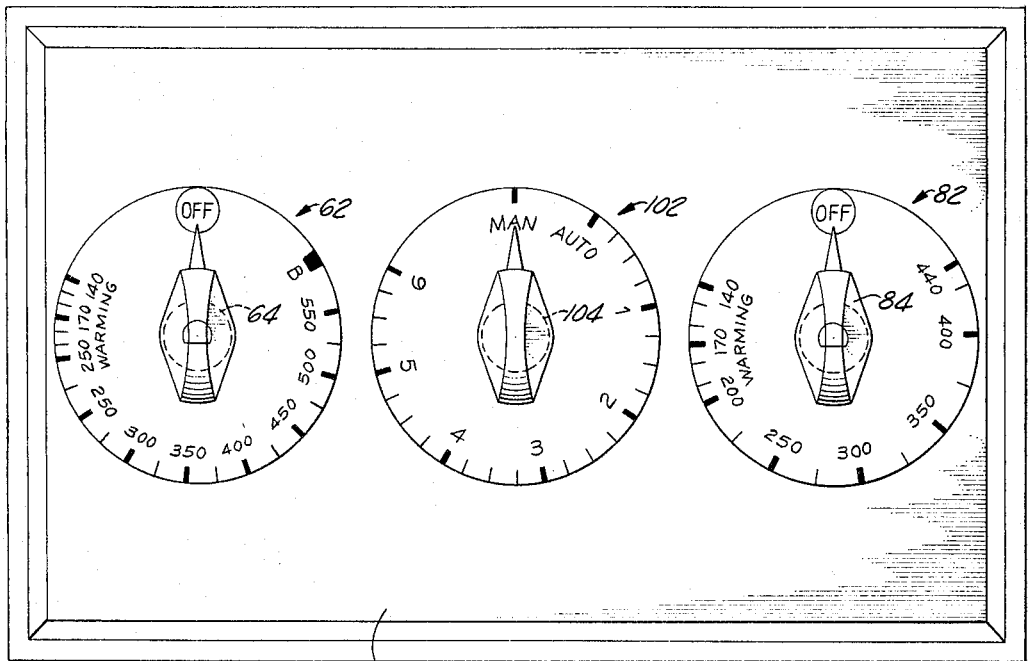
FIG. 1 is a view in front elevation of apparatus embodying features of the present invention.
Figure 2:
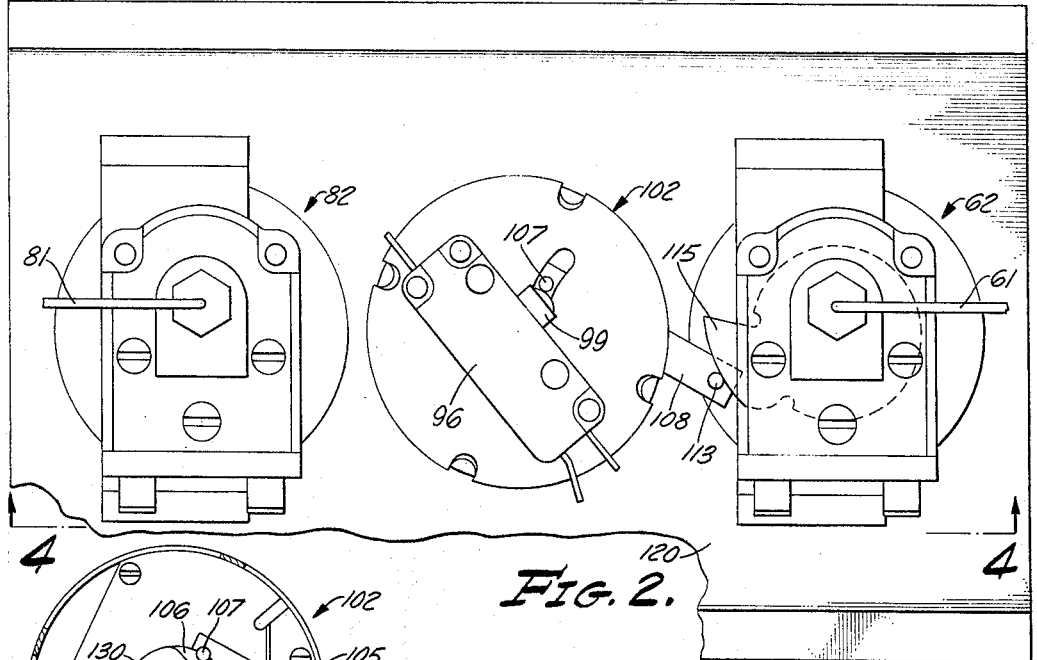
FIG. 2 is a view illustrating the back of the apparatus shown in FIG. 1.
Figure 3:
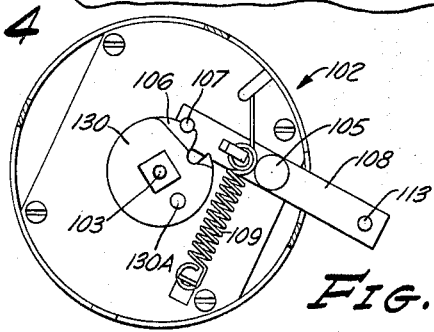
FIG. 3 is a view taken generally on the line 3—3 of FIG. 4 with the timer in its Manual position.
Figure 4:
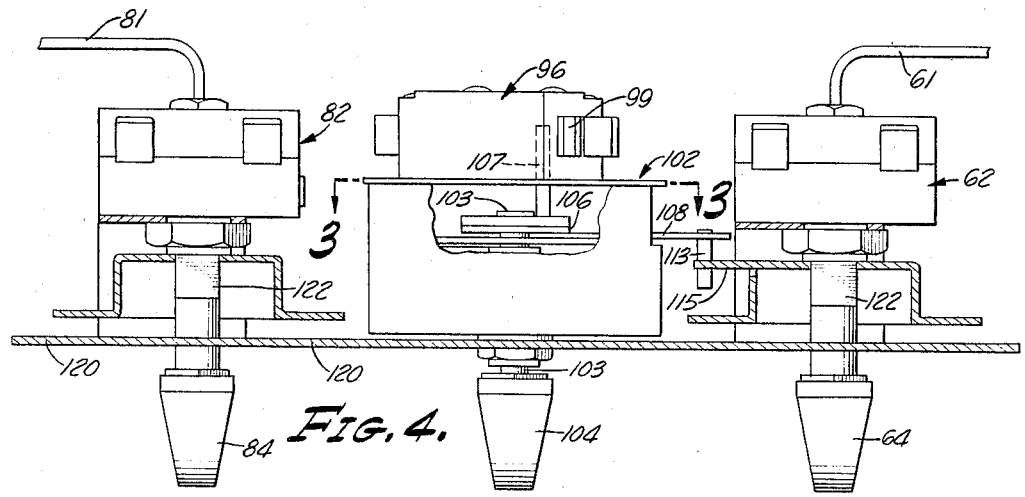
FIG. 4 is a view taken in the general direction indicated by arrows 4—4 in FIG. 2.
Figure 5:
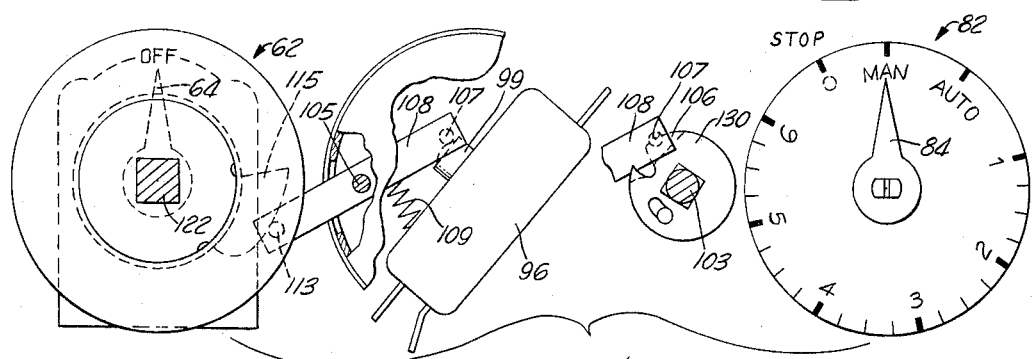
Figure 6:
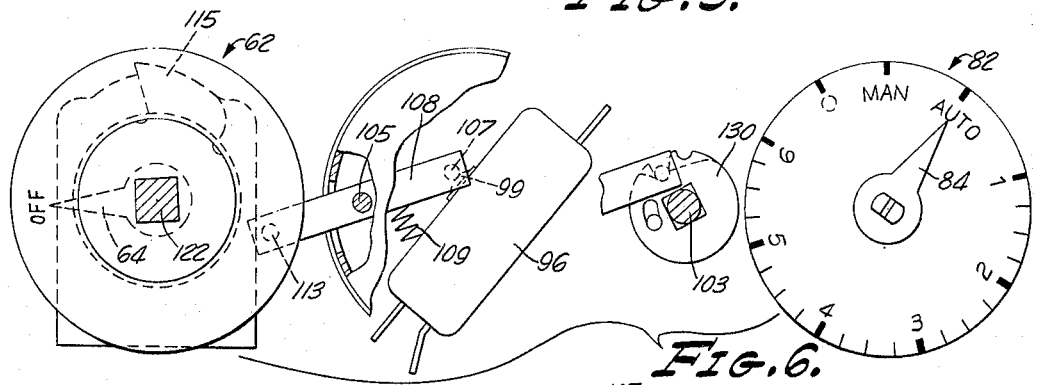

FIGS. 5 and 6 are generally diagrammatic views, FIG. 5 showing a relationship of parts when the timer is in its Manual position and the primary thermostat control is in its Off position, and FIG. 6 showing a relationship of parts when the primary thermostat control has been set for a temperature well above a temperature corresponding to the Off position and the timer has restored itself to its Automatic position wherein it is retained until either the primary thermostat knob is returned to Off position or the timer knob is returned manually to its Manual position.

Figure 7:
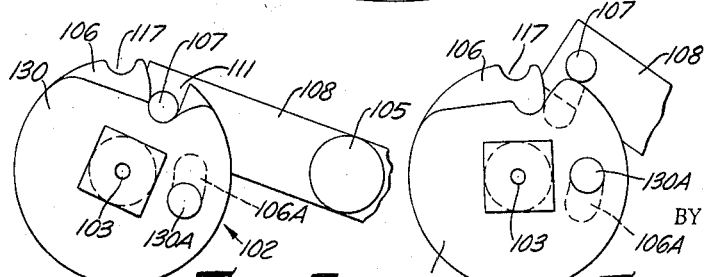
Figure 8:
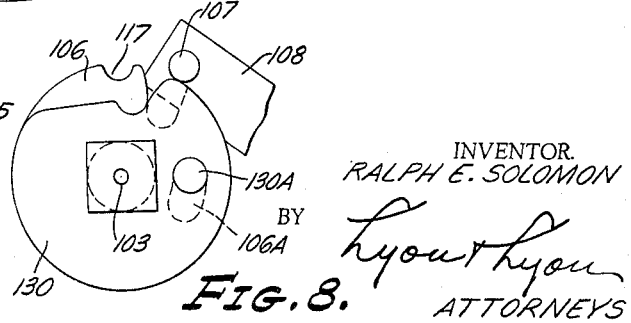

FIGS. 7 and 8 illustrate respectively conditions of the cam plate and indexing plate in the Automatic position and when and as the came plate is manually rotated to move a pin out of a notched portion of the indexing plate.

Figure 9:
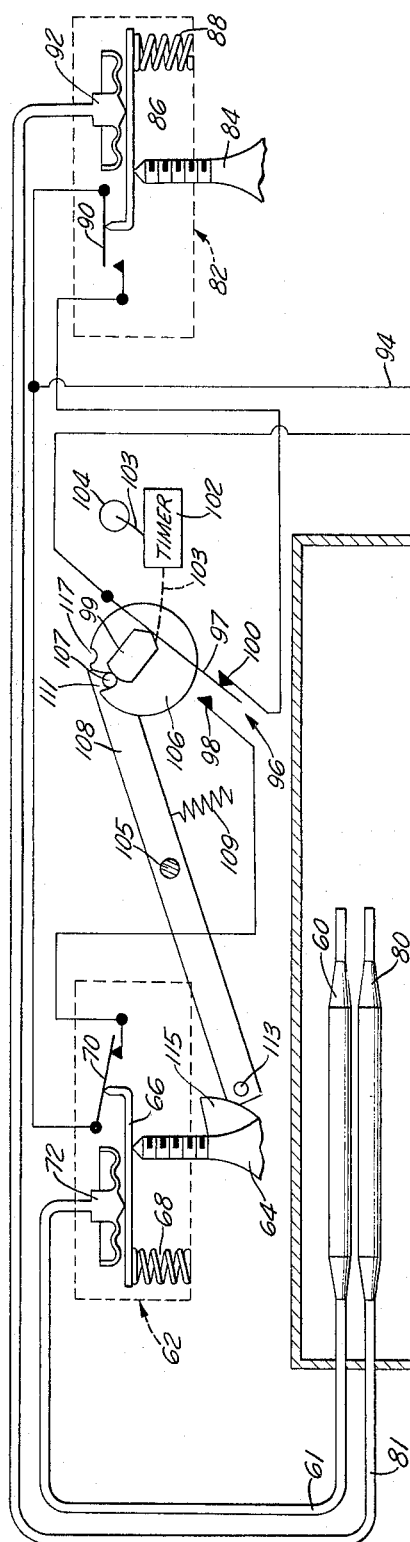
Figure 9:
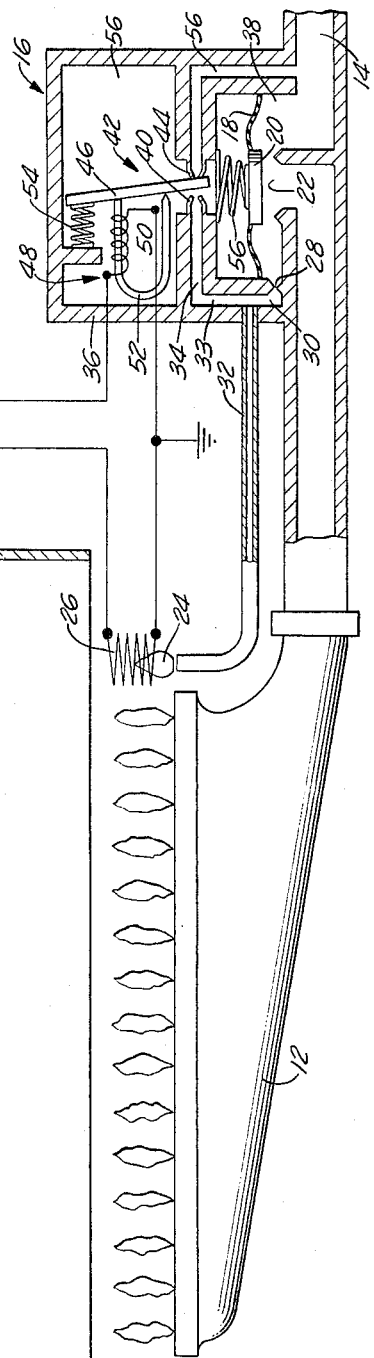

FIG. 9 is generally a diagrammatic representation of the apparatus previously described in a complete system.

In the drawings the oven 10 is heated by gas burning at the oven burner 12, the gas flow to such burner 12 being supplied from a gas inlet 14 and controlled by an electric diaphragm valve 16 having a diaphragm 18 with a movable valve element 20 thereon cooperating with its annular valve seat 22. When the valve 20, 22 is closed, there is no gas supplied to oven burner 12.

The system includes a constantly burning pilot burner 24 which serves to ignite the gas from burner 12 when valve 20, 22 is opened. The pilot burner 24 serves also to heat a thermocouple pilot generator 26 for developing a voltage and operating current to the electrical components connected thereto.

A constant supply of gas is supplied to pilot burner 24 from gas inlet 14 through a restricted opening 28, channel 30 and gas line 32, the channel 30 being in the form of two intersecting bore holes 33, 34 in valve casing 36 and the restricted opening 28 being a small apertured portion that communicates the valve inlet chamber 38 with channel 30.

This channel 30 terminates at a valve port 40 of a three-way valve 42 having a second aligned port 44 with such ports 40 and 44 being alternately closed by a movable flapper valve element 46 which may comprise the movable armature of an electromagnet 48 having a coil 50 wound on a stationary U-shaped core member 52, the lower leg of which is extended to provide a pivot for the armature 46, such armature 46 being normally urged by a coil compression spring 54 against port 40 to close it, but when coil 50 is energized, the force of spring 54 is overcome and the armature is pivoted to open port 40 and close port 44 as shown.

The port 44 is in communication with the gas inlet chamber 38 through a channel 56 in casing 36.

Thus, when the coil 50 is deenergized, port 40 is closed and port 44 is open and gas inlet pressure is present in the upper diaphragm chamber 56, i.e. the pressure on opposite sides of diaphragm 18 is equalized, and diaphragm 18 then moves downwardly to close valve 20, 22 either under its own resiliency or by the added resiliency of coil compression spring 56. When the coil 50 is then energized, port 44 is closed and port 40 is open in which case the gas in chamber 56 is vented through channel 30 and line 32 to the pilot burner 24 where it is burned, and the resulting differential pressure on opposite sides of diaphragm 18 causes it to move upwardly and open valve 20, 22 as shown.

A primary thermostat 60 is mounted in oven 10 to be responsive to the temperature therein, and this thermostat 60 which may be filled with a heat expansible fluid is used to operate its associated switch 62 from its normally closed condition to its open position when the thermostat senses a predetermined elevated temperature. The temperature at which such switch operation occurs may be adjusted by screw adjustment of a manually operable screw 64 serving as a movable fulcrum for the lever 66 having one end thereof urged upwardly by coil compression spring 68, its other end engageable with the movable switch element 70 and an intermediate portion of lever 66 being engaged by movable plunger 72, the plunger 72 being moved in response to oven temperature.

Likewise, a secondary thermostat 80 is mounted in oven 10 to be responsive to the temperature therein, and this thermostat 80 is used to operate its associated switch 82 from its normally closed condition to its open position when the thermostat 80 senses a predetermined elevated temperature. The temperature at which such switch operation occurs may be adjusted by manually operable screw 84 serving as a movable fulcrum for the lever 86 having one end thereof urged upwardly by coil compression spring 88, its other end engageable with the movable switch element 90 and an intermediate portion of lever 86 being engaged by a movable plunger 92, the plunger 92 being moved in response to oven temperature.

The movable contact elements 70, 90 of switches 62 and 82 are connected to a common conductor 94 connected to one terminal of coil 50, the other terminal of coil 50 being grounded and connected to one terminal of pilot generator 26 having its other terminal connected to the movable contact of a single pole throw timer switch 96, the stationary contacts 98, 100 of switch 96 being connected respectively to a corresponding stationary contact of switches 62 and 82.

The timer 102 for operating its associated switch 96 is a manually settable timer having a conventional mechanism which is urged by energy stored in a spring during such manual setting to return the timer towards its initial non-set condition.

Thus in FIG. 9, the timer 102 is illustrated as having a manually rotatable knob 104 mechanically connected through a shaft 103 to a cam disc 106 engaged by a pin 107 on a lever 108 pivoted on pin 105 and urged by tension spring 109 for movement of the movable switch arm 97 through its actuator 99 from its engagement with contact 98 to its engagement with contact 100 after a predetermined elapsed time established by manual rotation of knob 104. In such case, after said elapsed time the spring urged pin enters the large notched portion 111 of disc 106 to actuate switch arm 97 to its opsition shown in FIG. 9 and this corresponds to an Automatic position of the timer as described later. Thus, when the timer 102 is initially manually set for a timing cycle, the condition of switch 62 establishes the condition of the diaphragb valve 20, 22 and subsequently after the elapse of the predetermined time switch arm 97 engages contact 100, and then the condition of switch 82 establishes the condition of diaphragm valve 20, 22.

This arrangement allows one to select many modes of operation, some of which are now enumerated.

(1) *Defrost and cook.*—The primary thermostat 60 is set at defrosting temperature, and food will defrost for a time selected by timer 102 and automatically switch to cooking under the control of thermostat 80 at the end of the selected defrost period.

(2) *Sear and cook.*—The primary thermostat 60 is set at searing temperature and the thermostat 80 is set at cooking temperature, and food will sear for the time selected by timer 102 and then automatically switch to cooking at the end of the sear period.

(3) *Delay and cook.*—The primary thermostat 80 is set at Off position, i.e. the lowest temperature, and the secondary thermostat 80 is set at cooking temperature and cooking will be delayed for a time selected by timer 102 which then automatically initiates cooking at the end of the delay period.

(4) *Cook and hold warm.*—The primary thermostat 60 is set at cooking temperature, and secondary thermostat 80 is set at a hold-warm temperature, and food will cook for a time selected by timer 102 after which thermostat 80 is effective to maintain a hold-warm condition.

(5) *Manual cooking.*—The primary thermostat 60 operates as a standard oven control. The secondary thermostat 80 is set at Off position, i.e. the lowest temperature setting, if desired, and the timer 102 is not set.

An important feature of the present invention involves a mechanical interlock between the primary thermostat and the timer, and this interlock is illustrated digrammatically in FIG. 9 and more specifically in other figures.

The lever 108 is sufficiently prolonged and carries a pin 113 which is engageable with a cam portion 115 carried on the knob or screw 64 for maintaining pin 107 out of notched portion 111 and thus preventing closing of switch 97, 100 when the thermostat is set by knob 64 to a low temperature setting corresponding to an Off position of the primary thermostat. In this arrangement, the primary thermostat is effective when the timer (which also functions as a mode selector) is in a Manual position corresponding to the condition when pin 107 is adjacent the smaller notched portion 117 in disc 106. Assuming that the primary thermostat is set for a high temperature (cam 115 is ineffective to engage pin 113), the timer is stopped at the Automatic position when pin 107 enters the notched portion 111 of disc 106, and the control is then transferred from the primary thermostat to the secondary thermostat and the timer remains in the Automatic position; subsequently, the act of turning the primary thermostat knob to its Off position releases the timer for further travel so that it then returns itself to the Manual position. It is possible to return the timer by hand to the Manual position, but should this be overlooked, return of the timer to its Manual position is effected automatically in approximately forty-five minutes after the primary thermostat knob is manually returned to its Off position or setting.

Referring to the specific form of the apparatus shown in FIGS. 1–8, parts corresponding with those in FIG. 9 have the identical reference numerals for ease of comparison.

Mounted on a panel 120 are the primary thermostat control 62, the timer control 103 and secondary thermostat control 82, the thermostat controls being identical except that the primary thermostat control incorporates the cam plate 115 which is secured to the shaft 122 for rotation with knob 64.

Each thermostat knob incorporates an integral pointer cooperating with indicia on panel 120. The primary thermostat control may include markings from 140° F. to 550° F. and also a higher temperature marking B designating a broil temperature; and the knob 64 may be moved from the 140° F. position to a much lower temperature setting which, for practical purposes, is an Off setting as designated. Likewise, the secondary thermostat markings may be the same but, as shown, the highest temperature marking is 440° F.

The manually settable and automatically returnable timer 103 includes a knob 104 with an integrally formed pointer cooperating with indicia on the panel 120 to indicate a Manual (MAN) position, an automatic (AUTO) position and markings extending from 1 to 9 indicating the number of hours. It will be seen that the MAN marking corresponds to a time of zero hours, i.e. the position of the timer knob when the timer has timed itself out, and that the AUTO marking corresponds to a time setting of approximately one-half to three-quarters of an hour.

The timer shaft 103 on which knob 104 is mounted has a cam disc 130 secured thereto together with the notched indexing disc 106 which is loosely mounted on such shaft for limited movement thereon, the movement of disc 106 being limited by a lost motion connection between the discs 106 and 130 which is defined by a dimpled portion 130A (FIGS. 7 and 8) of disc 130 being positioned in an arcuate lost motion slot 106A in disc 106. This construction allows the indexing disc 106 to be formed with steep edge portions defining its notched portions 111 and 117 and the use of a less steep edge portion of disc 130 to cam the pin 107 out of the notched portion 111 of disc 106, as indicated in FIG. 6.

Many different food preparing procedures may be established, as indicated above. For so-called manual operation, the timer 103 is not set but is in its MAN position, and cooking temperatures are established in accordance with the position of knob 64 of the primary thermostat control 62, the secondary thermostat control 82 not being used in this mode of operation.

For a cooking operation followed after predetermined time by a hold-warm operation, the primary control 62 is set to the desired cooking temperature, the timer control 103 is set to the desired cooking time assumed to be, for example, two hours, and the secondary thermostat control is set to the desired hold-warm temperature, for example 170° F. With the controls thus set, cooking proceeds with the timer knob 104 being progressively and automatically returned to the AUTO position, and at such AUTO position the pin 107 on the spring urged lever 108 enters the notched portion 111 of disc 106 and causes operation of the single pole double throw switch 96 to transfer control from the primary thermostat to the secondary thermostat which then maintains the oven at the hold-warm temperature. Then to shut off the oven, one may (1) turn the secondary control knob 84 to its Off position, or (2) turn the primary control knob 64 to its Off position. In the latter instance, when knob 64 is returned to its Off position, the cam plate 115 on the same shaft as the knob 64 engages pin 113 and moves it and the lever 108 to withdraw the pin from the notched portion 111 of disc 106 to allow the timer switch 96 to return to its normal position, i.e. to return the temperature control to the primary thermostat which had been, by this operation, manually returned to its Off position; and also the timer is allowed to complete the remaining portion of its timing out cycle, i.e. the timer knob is then free to return to the MAN position which is automatically accomplished in say 30 to 45 minutes. At the MAN position of timer knob 104, the timer has timed itself out completely.

In addition to the two ways of shutting down the oven, a third way involves manually turning the timer knob from its arrested AUTO position to its MAN position in which case the switch actuating pin 107 is no longer effective to operate switch 96 and it switches control back to the primary thermostat and its knob must be returned manually to Off position.

It will be seen that the secondary thermostat control is effective only in the AUTO position of the timer, but even so such secondary thermostat control is ineffective when the primary thermostat knob be in its Off position.

It will also be seen that this arrangement which provides for automatic return of the timer to a Manual position obviates many problems present in other controls wherein one must return a mode selection knob to a manual position after using a time control.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an oven control system, a pair of thermostat controls at least one of which includes a knob settable from a low temperature setting to an elevated temperature setting; a timer; first means operably connected to said timer for alternatively rendering said one or the other of said thermostat controls effective to control oven temperature; and second means operated by the knob of said one thermostat control for preventing said first means from rendering said other of said thermostat controls effective.

2. An oven control system as set forth in claim 1 in which said timer has an automatically returnable knob manually positionable from a first position through a second position to a third position; third means for arresting movement of said timer knob in said second position in its return from said third to said second position; and said second means being operably connected to said third means for rendering said third means ineffective whereby said timer knob is allowed to return to said first position.

3. An oven control system as set forth in claim 1 in which said first means normally renders said one thermostat control effective to control oven temperature.

4. An oven control system as set forth in claim 3 in which said first means includes a single pole double throw switch and said second means includes a cam operated by said knob and a lever operated by said cam for operating said switch.

5. An oven control as set forth in claim 2 in which said third means includes a cam having a notched portion operated by said timer and a lever engageable with said notched portion; and said second means includes a member for disengaging said lever from said notched portion.

6. In an oven control system, a first thermostat control; a second thermostat control; a timer having an element movable manually from a first position through a second position and including means for automatically returning said element from said third position, through said second position to said first position; means for arresting movement of said element in said second position in its return movement from said third position; means operated in said second position of said element for changing temperature control of said oven from said first to the second of said controls; means for adjusting one of said controls; and means operated by the last mentioned means for disabling said arresting means.

7. An oven control system as set forth in claim 6 in which said element is a disc with a notched portion; a lever engageable with said notched portion; resilient means acting on said lever for urging the same in said notched portion; a member operated by said adjusting means and engageable with said lever for overcoming the force of said resilient means.

8. An oven control as set forth in claim 7 in which said lever operates said changing means.

9. An oven control system as set forth in claim 6 in which said disabling means is rendered effective in an Off position of said adjusting means.

10. In an oven control system, a thermostat control having an adjustable element; a second thermostat control; means operable for alternatively rendering said controls individually effective to control oven temperature; a timer; means operated by said timer for operating said means; said timer having an element movable manually from a first position, through a second position to a third position; means for arresting movement of said element in said second position in its return from said third position; and means operated by said adjustable element for disabling said arresting means.

11. An oven control system as set forth in claim 10 in which the first mentioned means is operated in said second position.

12. An oven control as set forth in claim 10 in which said disabling means is effective in an off position of said adjustable element.

References Cited by the Examiner

UNITED STATES PATENTS

| | | | |
|---|---|---|---|
| 2,331,570 | 10/1943 | Ray | 236—84 X |
| 3,093,722 | 6/1963 | Schauer | 219—413 X |
| 3,123,298 | 3/1964 | Wolffe | 236—46 |
| 3,170,061 | 2/1965 | Colalillo | 219—413 |

ALDEN D. STEWART, *Primary Examiner.*